United States Patent
Winkelnkemper

(10) Patent No.: US 8,284,577 B2
(45) Date of Patent: Oct. 9, 2012

(54) METHOD FOR OPERATION OF A CONVERTER CIRCUIT, AND APPARATUS FOR CARRYING OUT THE METHOD

(75) Inventor: Manfred Winkelnkemper, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 378 days.

(21) Appl. No.: 12/752,638

(22) Filed: Apr. 1, 2010

(65) Prior Publication Data

US 2010/0253304 A1    Oct. 7, 2010

(30) Foreign Application Priority Data

Apr. 2, 2009 (EP) .................................... 09157148

(51) Int. Cl.
*H02M 7/48* (2007.01)
(52) U.S. Cl. .......................................................... 363/71
(58) Field of Classification Search .................... 363/65, 363/71, 131
See application file for complete search history.

(56) References Cited

U.S. PATENT DOCUMENTS

| | | | |
|---|---|---|---|
| 5,070,440 A | 12/1991 | Walker | |
| 5,311,419 A * | 5/1994 | Shires | 363/65 |
| 6,696,823 B2 * | 2/2004 | Ledenev et al. | 323/272 |
| 8,040,702 B2 * | 10/2011 | Urakabe et al. | 363/65 |
| 2004/0252531 A1 | 12/2004 | Cheng et al. | |
| 2008/0232145 A1 | 9/2008 | Hiller et al. | |

FOREIGN PATENT DOCUMENTS

| | | |
|---|---|---|
| DE | 10 2005 040 543 A1 | 3/2007 |
| JP | 11-206167 A | 7/1999 |
| WO | WO 2007/023064 A1 | 3/2007 |

OTHER PUBLICATIONS

European Search Report for EP 09157148.9 dated Jun. 23, 2009.

* cited by examiner

*Primary Examiner* — Shawn Riley
(74) *Attorney, Agent, or Firm* — Buchanan Ingersoll & Rooney PC

(57) ABSTRACT

An exemplary method is disclosed for operation of a converter circuit having first and second partial converter systems, the partial converter systems being connected in series to one another via two series-connected inductances. A junction point of the two series-connected inductances forms an output connection. Each partial converter system can include at least one two-pole switching cell, each switching cell having two series-connected controllable bidirectional power semiconductor switches. The power semiconductor switches in the switching cells of the first and second partial converter system are controlled by first and second control signals. A capacitive energy store in the converter circuit can be designed independent of desired current at the output connection of the converter circuit.

18 Claims, 4 Drawing Sheets

(Prior art) Fig. 1

METHOD FOR OPERATION OF A CONVERTER CIRCUIT, AND APPARATUS FOR CARRYING OUT THE METHOD

RELATED APPLICATION

This application claims priority under 35 U.S.C. §119 to European Patent Application No. 09157148.9 filed in Europe on Apr. 2, 2009, the entire content of which is hereby incorporated by reference in its entirety.

FIELD

The disclosure relates to the field of power electronics, such as a method and device for operation of a converter circuit.

BACKGROUND INFORMATION

Converter circuits are used in a multiplicity of applications. For example, a converter circuit whose voltage can be scaled particularly easily is specified in the WO 2007/023064 A1, the disclosure of which is hereby incorporated by reference in its entirety. In this document, the disclosed converter circuit has a first and a second partial converter system, wherein the partial converter systems are connected in series to one another via two series-connected inductances. A junction point between the two series-connected inductances forms an output connection for example for an electrical load. Each partial converter system has at least one two-pole switching cell, wherein, when there are a plurality of switching cells in one partial converter system, these switching cells are connected in series to one another. Each two-pole switching cell has two series-connected controllable bidirectional power semiconductor switches with a controlled unidirectional current flow direction, and a capacitive energy store which is connected in parallel with the series circuit formed by the power semiconductor switches.

FIG. 1 shows a known apparatus for operation of a converter circuit according to WO 2007/023064 A1, which has a first control circuit for production of a control signal for controlling the power semiconductor switches in the switching cells of the first partial converter system, and has a second control circuit for production of a further control signal for controlling the power semiconductor switches in the switching cells of the second partial converter system.

The converter circuit according to WO 2007/023064 A1 can be operated such that a pure AC voltage and a pure alternating current are produced at the output connection. The capacitive energy stores for the switching cells are designed such that the voltage ripple on the capacitive energy stores remains within a predetermined fluctuation range for a given maximum current at the output connection and for this current being at a given frequency. If a lower frequency is desired than that on which the design was based, then the voltage ripple rises. If the intention is to produce a direct current or an alternating current with a direct-current component at the output connection, then the voltage ripple rises to virtually infinity. The capacitive energy stores in this case could either be fed externally or be selected to be infinitely large in order to avoid being completely discharged or indefinitely overcharged during operation with direct current or a direct-current component at the output connection.

The operation of a converter circuit according to WO 2007/023064 A1 does not allow the capacitive energy stores to be designed independently of the desired current at the output connection (i.e., independently of the frequency of the current).

SUMMARY

A method is disclosed for operation of a converter circuit having first and second partial converter systems connected in series to one another via two series-connected inductances, a junction point of the two series-connected inductances forming an output connection, each partial converter system having at least one two-pole switching cell, and each switching cell having two series-connected controllable bidirectional power semiconductor switches with a controlled unidirectional current flow direction, and a capacitive energy store connected in parallel with a series circuit formed by the power semiconductor switches, the method comprising: controlling the power semiconductor switches in the switching cells of the first partial converter system with a first control signal, the first control signal being formed from a voltage oscillation signal across the inductances and a first switching function for the power semiconductor switches in the switching cells of the first partial converter system; and controlling the power semiconductor switches in the switching cells in the second partial converter system with a second control signal, the second control signal being formed from the voltage oscillation signal across the inductances and a second switching function for the power semiconductor switches in the switching cells of the second partial converter system, wherein the first and second switching functions are formed by a voltage oscillation signal with respect to a voltage at the output connection, and a reference signal.

An apparatus is also disclosed for operation of a converter circuit having a first and second partial converter systems, the partial converter systems being connected in series to one another via two series-connected inductances, a junction point between the two series-connected inductances forming an output connection, each partial converter system having at least one two-pole switching cell, and each switching cell having two series-connected controllable bidirectional power semiconductor switches with a controlled unidirectional current flow direction, and a capacitive energy store connected in parallel with a series circuit formed by the power semiconductor switches, the apparatus comprising: a first control circuit for producing a first control signal for power semiconductor switches in switching cells of a first partial converter system, based on an input received as a voltage oscillation signal across two series-connected inductances and on a first switching function for the power semiconductor switches in switching cells of the first partial converter system; a second control circuit for producing a second control signal for power semiconductor switches in switching cells of the second partial converter system based on an input received as the voltage oscillation signal across the two series-connected inductances and on a second switching function for the power semiconductor switches in switching cells of the second partial converter system; and a first calculation unit for producing the first and second switching functions from a voltage oscillation signal with respect to an input representing a voltage at the output connection and a reference signal.

BRIEF DESCRIPTION OF THE DRAWINGS

Further objects, advantages and features of the present disclosure will become more apparent from the following detailed description of exemplary embodiments of the disclosure when read in conjunction with the drawings.

Reference symbols used in the drawings are listed in summarized form in the list of reference symbols. In principle, like elements are provided with the same reference symbols in the figures. The described embodiments represent examples of subject matter disclosed herein, without limiting the invention.

In the figures:

FIG. 1 shows a known apparatus for operation of a converter circuit;

FIG. 2 shows an exemplary embodiment of an apparatus as disclosed herein to apparatus according to the disclosure for carry out a method as disclosed herein for operation of a converter circuit;

FIG. 3 shows an exemplary time profile of a current at the output connection of the converter circuit;

FIG. 4 shows an exemplary time profile of a voltage at the output connection of the converter circuit; and FIG. 5 shows an exemplary time profile of the current through the first partial converter system and the current through the second partial converter system.

DETAILED DESCRIPTION

Figure 1:
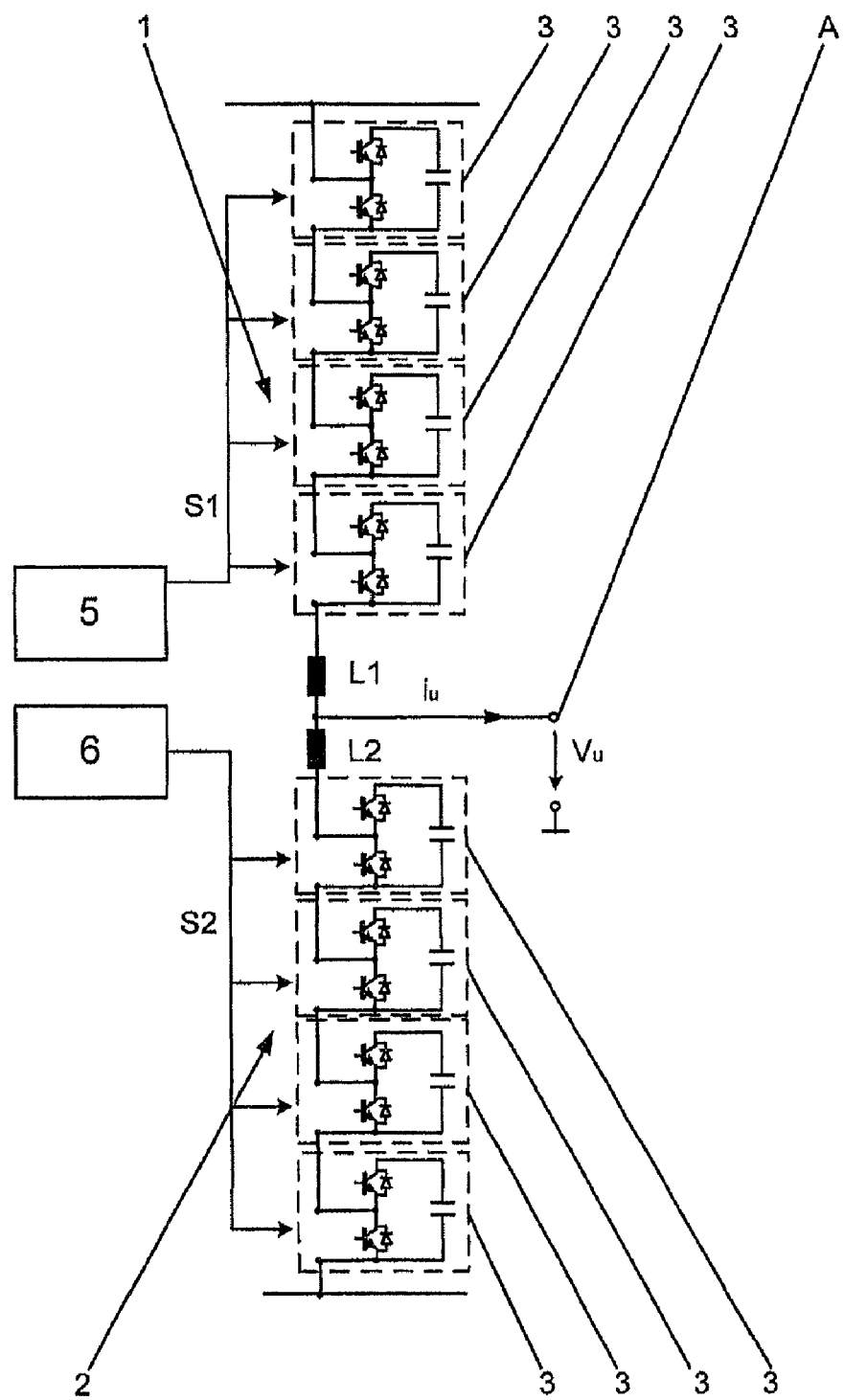

A method and apparatus for operation of a converter circuit are disclosed, by which capacitive energy stores in the converter circuit can be designed to be independent of desired current at an output connection of the converter circuit (e.g., independent of output frequency).

An exemplary converter circuit can include a first and a second partial converter system, wherein the partial converter systems are connected in series to one another via two series-connected inductances. A junction point of the two series-connected inductances can form an output connection. Each partial converter system can include at least one two-pole switching cell, and each switching cell can have two series-connected controllable bidirectional power semiconductor switches with a controlled unidirectional current flow direction and a capacitive energy store which is connected in parallel with the series circuit formed by the power semiconductor switches.

A number of switching cells in the first partial converter system can, for example, correspond to the number of switching cells in the second partial converter system. According to an exemplary method, the power semiconductor switches in the switching cells of the first partial converter system can be controlled by means for producing a control signal. The power semiconductor switches in the switching cells of the second partial converter system can be controlled by means for producing a further control signal. According to an exemplary embodiment of the disclosure, the control signal is formed from a voltage oscillation signal across the inductances and a switching function for the power semiconductor switches in the switching cells of the first partial converter system. The further control signal is formed from the voltage oscillation signal across the inductances and a switching function for the power semiconductor switches in the switching cells of the second partial converter system. The switching functions can be formed (e.g., at the same time or at different times) by means which produce a voltage oscillation signal with respect to the voltage at an output connection and a selectable reference signal. Using the applied oscillations, that is to say via the voltage oscillation signal across the inductances for the production of the control signal and the further control signal, and via the voltage oscillation signal with respect to the voltage at the output connection for production of the switching functions, the voltage ripple on the capacitive energy stores can be reduced significantly when a desired current is flowing at the output connection of the converter circuit, such that the capacitive energy stores may be designed with respect to, for example, the voltage ripple (which has now been reduced), and therefore can be independent of a desired output current.

An exemplary apparatus according to the disclosure for carrying out a method for operation of a converter circuit can include a first control circuit, which is used for production of the control signal and is connected to the power semiconductor switches in the switching cells of the first partial converter system. Furthermore, the apparatus can include a second control circuit, which is used to produce the further control signal and is connected to the power semiconductor switches in the switching cells of the second partial converter system.

According to the disclosure, in order to form the control signal, the first control circuit can be supplied with the voltage oscillation signal across the inductances and the switching function for the power semiconductor switches in the switching cells of the first partial converter system. In order to form the further control signal, the second control circuit can be supplied with the voltage oscillation signal across the inductances and the switching function for the power semiconductor switches in the switching cells of the second partial converter system. Furthermore, a first calculation unit can be provided in order to calculate the switching functions from a voltage oscillation signal with respect to the voltage at the output connection and a selectable reference signal.

An exemplary apparatus according to the disclosure for carrying out the method for operation of the converter circuit can therefore be produced very easily and at low cost, because the circuit complexity can be kept extremely low and, involve only a small number of components for construction. The method according to the disclosure can therefore be carried out particularly easily using such an apparatus.

Figure 2:
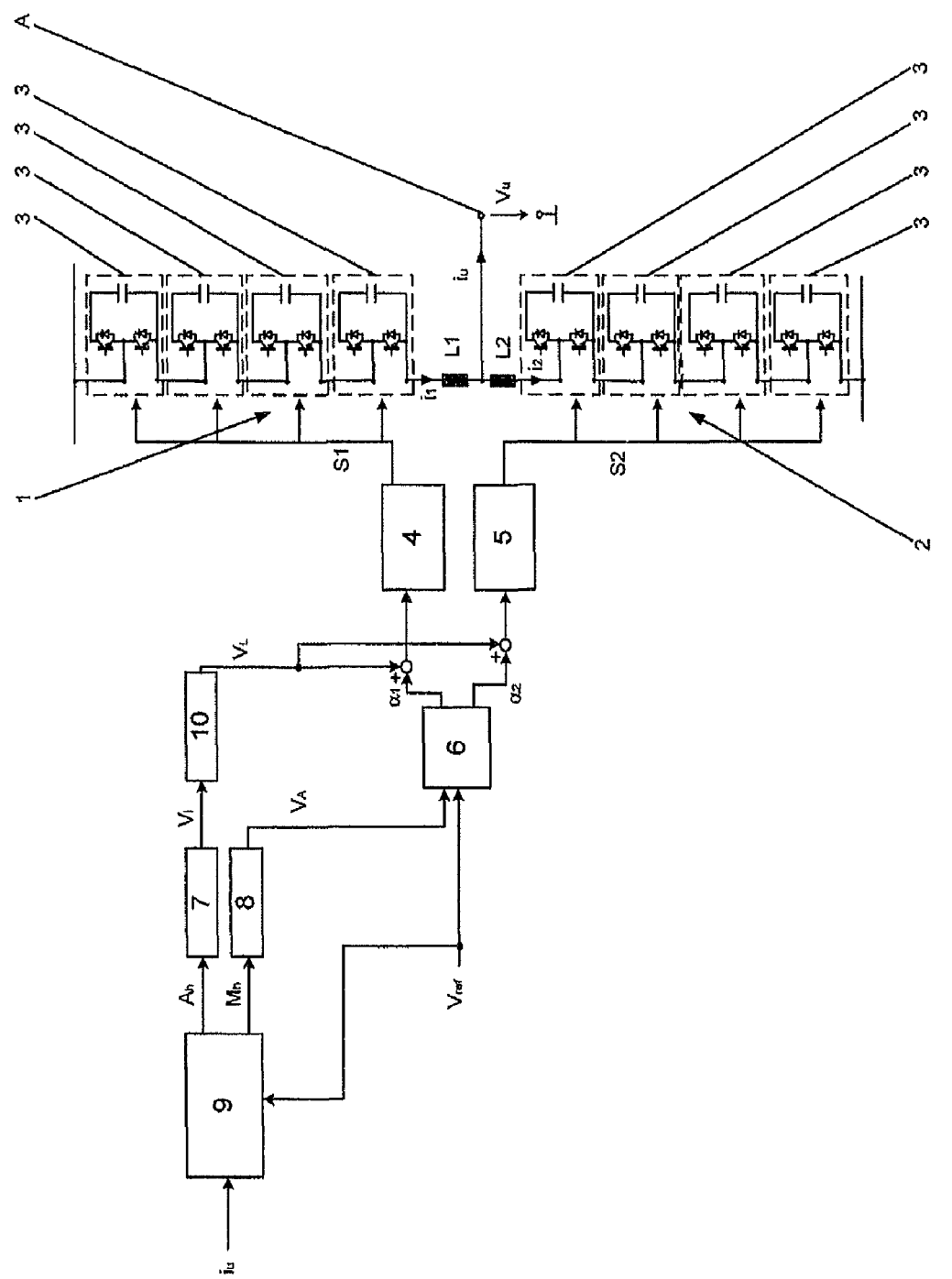

FIG. 2 shows an exemplary embodiment of an apparatus according to the disclosure for carrying out the method according to the disclosure for operation of a converter circuit. The exemplary converter circuit shown in FIG. 2 has a first and a second partial converter system 1, 2, wherein the partial converter systems 1, 2 are connected in series to one another via two series-connected inductances L1, L2. The junction point between the two series-connected inductances L1, L2 forms an output connection A. Each partial converter system 1, 2 can have at least one two-pole switching cell 3. One partial converter system 1, 2 can have a plurality of switching cells 3, these switching cells 3 being connected in series to one another, as shown in FIG. 2. Each switching cell 3 has two series-connected controllable bidirectional power semiconductor switches with a controlled unidirectional current flow direction and a capacitive energy store which is connected in parallel with the series circuit formed by the power semiconductor switches. The controllable power semiconductor switches are, for example, in the form of gate turn-off thyristors (GTO) or integrated thyristors with a commutated control electrode (IGCT—Integrated Gate Commutated Thyristors), each with a diode connected back-to-back in parallel. However, it is also feasible for a controllable power semiconductor switch to be, for example, in the form of a power MOSFET with a diode additionally connected back-to-back in parallel with it, or in the form of a bipolar transistor with an insulated gate electrode (IGBT) and a diode additionally connected back-to-back in parallel with it. The number of switching cells 3 in the first partial converter system 1 corresponds, for example, to the number of switching cells 3 in the second partial converter system 2 although any desired, suitable converter can be used.

According to an exemplary method, the power semiconductor switches in the switching cells 3 of the first partial converter system 1 can be controlled by means which produce a control signal S1, and the power semiconductor switches in the switching cells 3 of the second partial converter system 2 can be controlled by means which produce a further control signal S2. The control signal S1 for the switching cells 3 in the first partial converter system 1 and the control signal S2 for the switching cells 3 in the second partial converter system 2 can, for example, be offset in time with respect to one another for each switching cell 3, as a result of which each switching cell 3 can be controlled with a time offset. According to the disclosure, the control signal S1 can be formed from a voltage oscillation signal $V_L$ across the inductances L1, L2 and a switching function $\alpha_1$ for the power semiconductor switches in the switching cells 3 of the first partial converter system 1 (for example, from the sum of the two variables). The further control signal S2 can be formed from the voltage oscillation signal $V_L$ across the inductances L1, L2 and a switching function $\alpha_2$ for the power semiconductor switches in the switching cells 3 of the second partial converter system 2 (for example, from the sum of the two variables). The switching functions $\alpha_1$, $\alpha_2$ can be formed by means which produce a voltage oscillation signal $V_A$ with respect to the voltage $V_u$ at the output connection A and a selectable reference signal $V_{ref}$ (for example, at the same time or at any suitable, desired times). A reference voltage signal with respect to the voltage $V_u$ at the output connection A can, for example, be selected as the reference signal $V_{ref}$ and can be formed, for example, by regulation of the actual value of the current $i_u$ at the output connection A at a nominal value.

As a result of the applied oscillations, that is to say by means for producing the voltage oscillation signal $V_L$ across the inductances L1, L2 for production of the control signal S1 and the further control signal S2, and by means which produce the voltage oscillation signal $V_A$ with respect to the voltage $V_u$ at the output connection A in order to produce the switching functions $\alpha_1$, $\alpha_2$, it can be advantageously possible to ensure that the voltage ripple on the capacitive energy stores can be significantly reduced (e.g., to a negligible amount) for a desired current $i_u$ at the output connection A of the converter circuit, such that, for example, the capacitive energy store need be designed only for the voltage ripple which has now been reduced, and therefore independently of the desired output current $i_u$.

According to the disclosure, the switching function $\alpha_1$ for the power semiconductor switches in the switching cells 3 of the first partial converter system 1 can, for example, be formed from the voltage oscillation signal $V_A$ with respect to the voltage $V_u$ of the output connection A and the selectable reference signal $V_{ref}$ using the following formula:

$$\alpha_1 = \tfrac{1}{2}(1 - V_{ref} - V_A) \quad [1]$$

Furthermore, a switching function $\alpha_2$ for the power semiconductor switches in the switching cells 3 of the second partial converter system 2 can be formed from the voltage oscillation signal $V_A$ with respect to the voltage $V_u$ at the output connection A and the selectable reference signal $V_{ref}$ using the following formula:

$$\alpha_2 = \tfrac{1}{2}(1 + V_{ref} + V_A) \quad [2]$$

According to the disclosure, the voltage oscillation signal $V_L$ across the inductances L1, L2 can be formed from a current oscillation signal $V_i$ of the partial converter system 1, 2, as illustrated by the following formula:

$$V_L = V_i \cdot (j\omega(L1 + L2)) \quad [3]$$

The current oscillation signal $V_i$ of the partial converter system 1, 2 is, for example, in turn formed from a current oscillation signal amplitude value $A_h$, such as, for example, by multiplication of the current oscillation signal amplitude value $A_h$ by an oscillation at a freely variable frequency $\overline{\omega}$ and a phase shift $\phi$, as illustrated by the following formula:

$$V_i = A_h \cdot \cos(\omega t + \phi) \quad [4]$$

The current oscillation signal amplitude value $A_h$ is, for example, formed from the current actual value $i_u$ at the output connection A, such as from the direct-current component $i_0$ of the current $i_u$ at the output connection A which current actual value $i_u$ is, for example, measured, and the reference signal $V_{ref}$. The following relationship as shown in formula [5.1] can be used to form the current oscillation signal amplitude value $A_h$:

$$\tfrac{1}{2} I_0 \cdot M_h^2 + A_h \cdot M_h \cdot \cos(\Delta\phi) - (1 + V_{ref}) \cdot (1 - V_{ref}) \cdot 1_0 = 0 \quad [5.1]$$

and, for example, using formula [5.2]

$$A_h = M_h \quad [5.2]$$

where $\Delta\phi$ indicates, for example, the phase difference between the applied oscillations and the voltage $V_u$ at the output connection A. It should be noted that the ratio of $A_h$ to $M_h$ in formula [5.2] has been selected only by way of example, that is to say the ratio of $A_h$ to $M_h$ can be selected freely. Formula [5.1] may, for example, be solved only for the product oscillation signal amplitude vale $A_h$ in order to determine the current oscillation signal amplitude value $A_h$.

Furthermore, the voltage oscillation signal $V_A$ with respect to the voltage $V_u$ at the output connection A is, for example, formed from a voltage oscillation signal amplitude value $M_h$, such as, for example, by multiplication of the voltage oscillation signal amplitude value $M_h$ by an oscillation at freely variable frequency $\omega$ and a phase shift $\phi$, as illustrated by the following formula:

$$V_A = M_h \cdot \cos(\omega t + \phi) \quad [6]$$

The voltage oscillation signal amplitude value $M_h$ can be formed from the current actual value $i_u$ at the output connection A and the reference signal $V_{ref}$, in which case it can, for example, be advantageously possible to make use of the formulae [5.1] and [5.2], and the formula [5.1] can be solved for the voltage oscillation signal amplitude value $M_h$ only to determine the voltage oscillation signal amplitude value $M_h$.

The current oscillation signal $V_i$ of the partial converter systems 1, 2, the voltage oscillation signal $V_L$ across the inductances L1, L2 and the voltage oscillation signal $V_A$ with respect to the voltage $V_u$ of the output connection A are, for example, at the same frequency $\omega$. Furthermore, the current oscillation signal $V_i$ of the partial converter systems 1, 2, the voltage oscillation signal $V_L$ across the inductances L1, L2 and the voltage oscillation signal $V_A$ with respect to the voltage $V_u$ at the output connection A can, for example, have the same phase shift $\phi$, but they need not necessarily have the same phase shift $\phi$.

On the basis of an exemplary method according to the disclosure, it is now advantageously possible to produce a current $i_u$ with a direct-current component and with an alternating current component at the frequency $\omega$, which is based on the applied oscillations mentioned above, at the output connection A, wherein only the applied oscillations influence the voltage ripple on the capacitive energy stores of the switching cells 3, and the voltage ripple can therefore be kept low. The capacitive energy stores can, for example, therefore be designed only with respect to this low voltage ripple, that is to say independently of the desired output current $i_u$. The current $i_u$ at the output connection A accordingly becomes:

$$i_u(t) = i_0 + \hat{i}_u \cdot \cos(\omega t + \phi) \quad [7]$$

where $i_0$ represents the direct-current component and $\hat{i}_u$ represents the amplitude of said alternating-current component.

Figure 3:
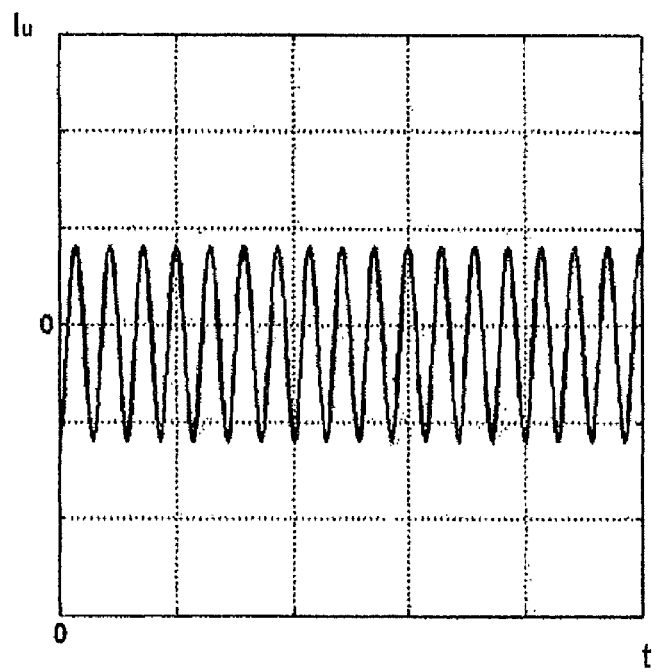
Figure 4:
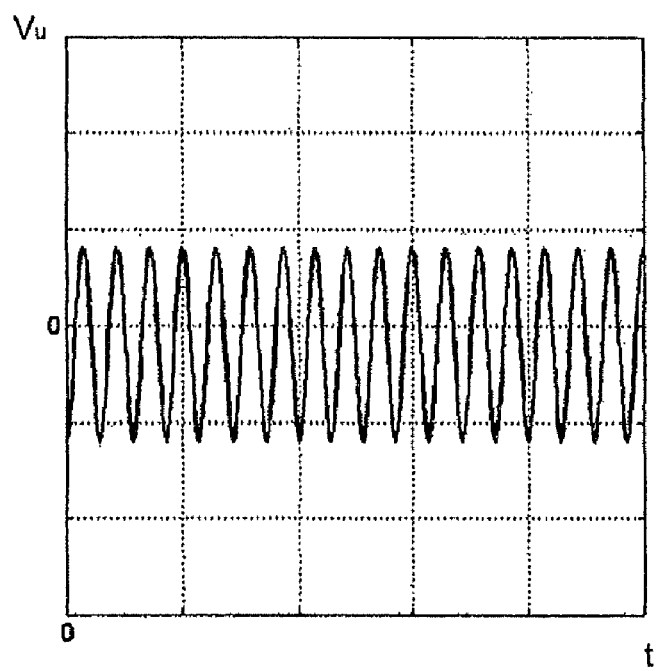
Figure 5:
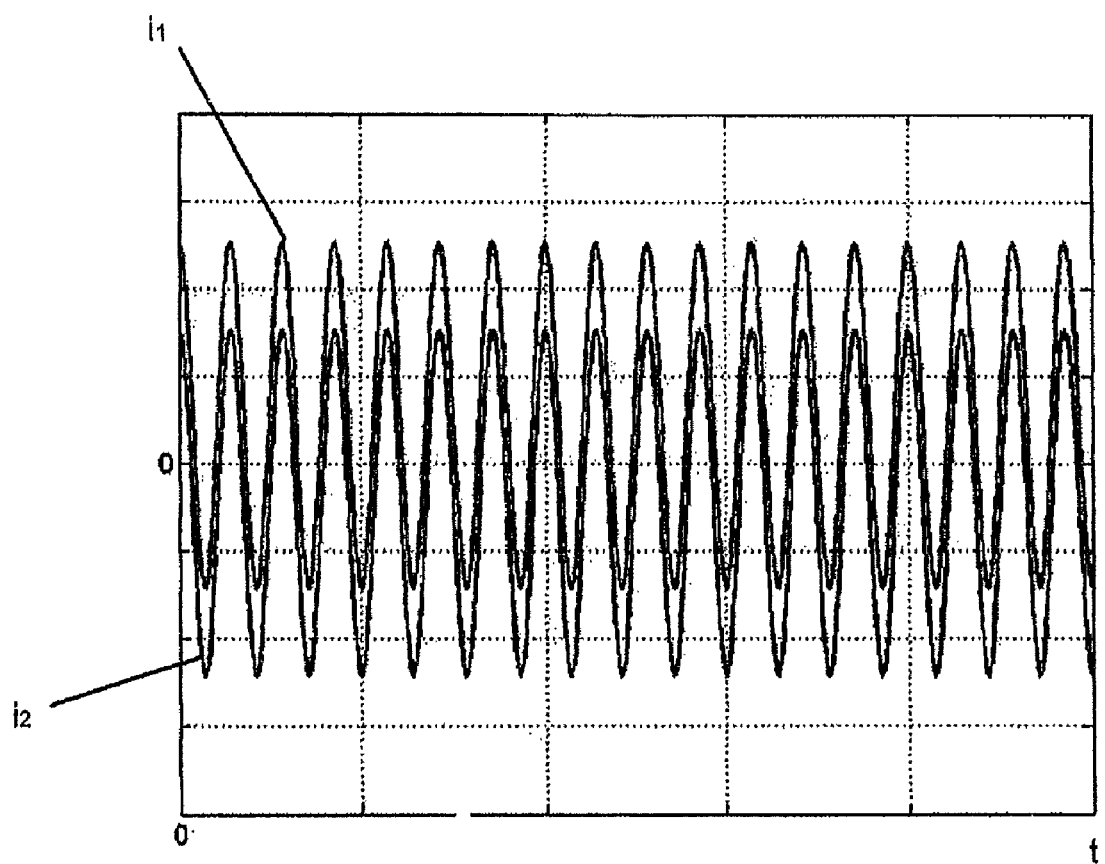

For illustrative purposes, FIG. 3 shows an exemplary time profile of a current $i_u$ at the output connection of the converter circuit. Furthermore, FIG. 4 shows an exemplary time profile of a voltage $V_u$ of the output connection A of the converter circuit. FIG. 5 shows an exemplary time profile of the current $i_1$ through the first partial converter system 1 and of the current $i_2$ through the second partial converter system 2, wherein both currents $i_1$, $i_2$ likewise have a direct-current component and an alternating-current component at the frequency $\omega$, caused by the abovementioned applied oscillations. For the sake of completeness, it should be mentioned that the currents in the capacitive energy stores do not have any direct-current component and likewise have no alternating-current components at the frequency $\omega$, or else at twice the frequency $\omega$ of the abovementioned applied oscillations.

In a polyphase system, for example in a three-phase system with three converter circuits, the applied oscillations, if they are selected to have the same phase shifts, appear as a common-mode voltage on a polyphase load which is connected to the phase terminations A. For example, additional current oscillations are produced. This method can be used, for example, in the event of overmodulation. In contrast to overmodulation, the frequency and phase angle of the common-mode voltage are in this case undefined. The output current $i_0$, which is then a polyphase output current, is a pure direct current, that is to say it has no alternating-current components.

If the current $i_u$ of the output connection A is intended to have a desired alternating-current component $\hat{i}_u \cdot \cos(\omega_u t + \phi_u)$ at the frequency $\omega_u$ and with a desired phase shift $\phi_u$, when the formula [5.1] is modified as follows:

$$\frac{1}{2} \hat{i}_u \cdot \cos(\omega_u t + \varphi_u) \cdot M_h^2 + A_h \cdot M_h \cos(\Delta \varphi) - \quad [8]$$
$$(1 + V_{ref}) \cdot (1 - V_{ref}) \cdot \hat{i}_u \cdot \cos(\omega_u t + \varphi_u) \equiv 0$$

where formula [5.2] can once again be used to determine the current oscillation signal amplitude value $A_h$, and the current oscillation signal amplitude value $A_h$ and the voltage oscillation signal amplitude value $M_h$ can be determined as already described above, from formula [8] and formula [5.2]. The current $i_u$ of the output connection A then, in the desired manner, becomes:

$$i_u(t) = \hat{i}_u \cdot \cos(\omega_u t + \phi_u) + \hat{i}_h \cdot \cos(\omega t + \phi) \quad [9]$$

where $\hat{i}_u$ is an assumed current amplitude value.

The apparatus according to the disclosure as shown in FIG. 1 has a first control circuit 4 which is used to produce the control signal S1 and is connected to the power semiconductor switches in the switching cells 3 of the first partial converter system 1. Furthermore, a second control circuit 5 is provided, which is used to produce the further control signal S2 and is connected to the power semiconductor switches in the switching cells 3 of the second partial converter system 2. According to the disclosure, in order to form the control signal S1, the first control circuit 4 is supplied with the sum of the voltage oscillation signal $V_L$ across the inductances L1, L2 and the switching function $\alpha_1$ for the power semiconductor switches in the switching cells 3 of the first partial converter system 1. In order to form the further control signal S2, the second control circuit 5 is supplied with the sum of the voltage oscillation signal $V_L$ across the inductances L1, L2 and the switching function $\alpha_2$ for the power semiconductor switches in the switching cells 3 of the second partial converter system 2. By way of example, a look-up table is in each case used to form the control signal S1 and the further control signal S2, in the first and second control circuits 4, 5, in which the switching function $\alpha_1$ can be permanently associated with corresponding control signals S1, and in which the switching function $\alpha_2$ can be permanently associated with corresponding further control signals S2 or, for example, a modulator in each case, which is based on a method for pulse-width modulation. Furthermore, a first calculation unit 6 can be provided in order to form the switching functions $\alpha_1$, $\alpha_2$ by calculation using formulae [1] and [2] from the voltage oscillation signal $V_A$ with respect to the voltage $V_u$ at the output connection A and a selectable reference signal $V_{ref}$.

As shown in FIG. 2, a second calculation unit 10 can be provided in order to form the voltage oscillation signal $V_L$ across the inductances L1, L2 from a current oscillation signal $V_i$ of the partial converter systems 1, 2, wherein the second calculation unit 10 forms the voltage oscillation signal $V_L$ across the inductances L1, L2 by calculation of the formula [3].

Furthermore, a third calculation unit (7) can be provided in order to form the current oscillation signal $V_i$ of the partial converter systems 1, 2 from a current oscillation signal amplitude value $A_h$, and forms the current oscillation signal $V_i$ of the partial converter systems 1, 2 by calculation using the formula [4].

Furthermore, a fourth calculation unit 9 can be provided in order to form the current oscillation signal amplitude value $A_h$ from the current actual value $i_u$ at the output connection A and the reference signal $V_{ref}$, wherein the fourth calculation unit 9 forms the current oscillation signal amplitude value $A_h$ by calculation using the formulae [5.1] and [5.2], or using the formulae [8] and [5.2].

A fifth calculation unit 8 can be provided to form the voltage oscillation signal $V_A$ with respect to the voltage $V_u$ at the output connection A from a voltage oscillation signal amplitude value $M_h$, wherein the fifth calculation unit 8 forms the voltage oscillation signal $V_A$ with respect to the voltage $V_u$ at the output connection A by calculation using formula [6].

The already mentioned fourth calculation unit 9 can also be used to form the voltage oscillation signal amplitude value $M_h$ from the current actual value $i_u$ at the output connection A and the reference signal $V_{ref}$, wherein the fourth calculation unit 9 forms the voltage oscillation amplitude value $M_h$ by calculation using the formulae [5.1] and [5.2], or using the formulae [8] and [5.2].

An exemplary apparatus according to the disclosure, such as that shown in FIG. 2, for carrying out a method according to the disclosure for operation of a converter circuit, can be produced very easily and at low cost, because the circuit complexity is extremely low and, furthermore, only a small number of components need to be used for construction. This apparatus therefore allows the method according to the disclosure to be carried out particularly easily.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 First partial converter system
2 Second partial converter system
3 Switching cell
4 First control circuit 5 Second control circuit
6 First calculation unit
7 Third calculation unit
8 Fifth calculation unit
9 Fourth calculation unit
10 Second calculation unit

What is claimed is:

1. A method for operation of a converter circuit having first and second partial converter systems connected in series to one another via two series-connected inductances, a junction point of the two series-connected inductances forming an output connection, each partial converter system having at least one two-pole switching cell, and each switching cell having two series-connected controllable bidirectional power semiconductor switches with a controlled unidirectional current flow direction, and a capacitive energy store connected in parallel with a series circuit formed by the power semiconductor switches, the method comprising:
controlling the power semiconductor switches in the switching cells of the first partial converter system with a first control signal, the first control signal being formed from a voltage oscillation signal across the inductances and a first switching function for the power semiconductor switches in the switching cells of the first partial converter system; and
controlling the power semiconductor switches in the switching cells in the second partial converter system with a second control signal, the second control signal being formed from the voltage oscillation signal across the inductances and a second switching function for the power semiconductor switches in the switching cells of the second partial converter system, wherein the first and second switching functions are formed by a voltage oscillation signal with respect to a voltage at the output connection, and a reference signal.

2. The method as claimed in claim 1, wherein the voltage oscillation signal across the inductances is formed from a current oscillation signal of the partial converter systems.

3. The method as claimed in claim 2, wherein the current oscillation signal of the partial converter systems is formed from a current oscillation signal amplitude value.

4. The method as claimed in claim 3, wherein the current oscillation signal amplitude value is formed from a current actual value at the output connection and the reference signal.

5. The method as claimed in claim 1, wherein the voltage oscillation signal with respect to the voltage at the output connection is formed from a voltage oscillation signal amplitude value.

6. The method as claimed in claim 5, wherein the voltage oscillation signal amplitude value is formed from a current actual value at the output connection and the reference signal.

7. The method as claimed in claim 2, wherein the current oscillation signal of the partial converter systems, the voltage oscillation signal across the inductances, and the voltage oscillation signal with respect to the voltage at the output connection are at a same frequency.

8. The method as claimed in claim 2, wherein the current oscillation signal of the partial converter systems, the voltage oscillation signal across the inductances, and the voltage oscillation signal with respect to the voltage at the output connection have a same phase shift.

9. The method as claimed in claim 1, wherein a reference voltage signal with respect to the voltage of the output connection is selected as the reference signal.

10. An apparatus for operation of a converter circuit having a first and second partial converter systems, the partial converter systems being connected in series to one another via two series-connected inductances, a junction point between the two series-connected inductances forming an output connection, each partial converter system having at least one two-pole switching cell, and each switching cell having two series-connected controllable bidirectional power semiconductor switches with a controlled unidirectional current flow direction, and a capacitive energy store connected in parallel with a series circuit formed by the power semiconductor switches, the apparatus comprising:
a first control circuit for producing a first control signal for power semiconductor switches in switching cells of a first partial converter system, based on an input received as a voltage oscillation signal across two series-connected inductances and on a first switching function for the power semiconductor switches in switching cells of the first partial converter system;
a second control circuit for producing a second control signal for power semiconductor switches in switching cells of the second partial converter system based on an input received as the voltage oscillation signal across the two series-connected inductances and on a second switching function for the power semiconductor switches in switching cells of the second partial converter system; and
a first calculation unit for producing the first and second switching functions from a voltage oscillation signal with respect to an input representing a voltage at the output connection and a reference signal.

11. The apparatus as claimed in claim 10, comprising:
a second calculation unit for forming the voltage oscillation signal across the two series-connected inductances from a current oscillation signal of the partial converter systems.

12. The apparatus as claimed in claim 11, comprising:
a third calculation unit for forming the current oscillation signal of the partial converter systems from a current oscillation signal amplitude value.

13. The apparatus as claimed in claim 12, comprising:
a fourth calculation unit for forming the current oscillation signal amplitude value from a current actual value of the output connection and the reference signal.

14. The apparatus as claimed in claim 13, comprising:
a fifth calculation unit for forming the voltage oscillation signal with respect to the voltage of the output connection from a voltage oscillation signal amplitude value.

15. The apparatus as claimed in claim 14, wherein the fourth calculation unit forms the voltage oscillation signal amplitude value from the current actual value at the output connection and the reference signal.

16. The method as claimed in claim 7, wherein the current oscillation signal of the partial converter systems, the voltage oscillation signal across the inductances, and the voltage oscillation signal with respect to the voltage at the output connection have a same phase shift.

17. The method as claimed in claim 16, wherein a reference voltage signal with respect to the voltage of the output connection is selected as the reference signal.

18. The apparatus as claimed in claim 10, in combination with:
The first and second partial converter systems connected in series to one another via the two series-connected inductances.

* * * * *